No. 814,798. PATENTED MAR. 13, 1906.
H. P. PALIN.
TIRE PROTECTOR.
APPLICATION FILED JUNE 15, 1905.

Witnesses:
Arthur E. Randall
Robert Wallace

Inventor:
Henry P. Palin
by Wm. A. Copeland
Attorney.

UNITED STATES PATENT OFFICE.

HENRY P. PALIN, OF NORTH ATTLEBORO, MASSACHUSETTS.

TIRE-PROTECTOR.

No. 814,798.

Specification of Letters Patent.

Patented March 13, 1906.

Application filed June 15, 1905. Serial No. 265,355.

*To all whom it may concern:*

Be it known that I, HENRY P. PALIN, of North Attleboro, in the county of Bristol and State of Massachusetts, have invented certain new and useful Improvements in Tire-Protectors, of which the following is a specification.

The invention relates especially to rubber tires for vehicle-wheels in which metal rivets are employed on the tread-surface of the outer tube of the tire or on the tread side of a cover or sleeve to protect the tire and to prevent slipping.

Sometimes tires are provided with leather protector sleeves or covers having rivets which pass through the sheet of material of which the sleeve or cover is composed, the rivet passing through a washer or bur on the tread side and then headed down upon the washer. As usually constructed flat burs or washers are employed and the hole for the rivet is of uniform diameter throughout, and when the head of the rivet is worn down to the washer the rivet will become loosened.

The object of this invention is to so form the bur and rivet that not only will the bur retard the wear of the rivet and will wear down with the rivet, but at the same time the shank of the rivet will be so constructed as to form a continuous head as fast as the bur wears back and prevent the loosening of the rivet or bur until the bur is entirely worn through. The rivets and burs will form protuberances on the tread-surface to prevent slipping of the tire, as well as to take up the wear.

The invention will now be fully described, and the novel features thereof will be particularly pointed out in the claims at the close of the specification, reference being had to the accompanying drawings, which form a part hereof.

Figure 1:
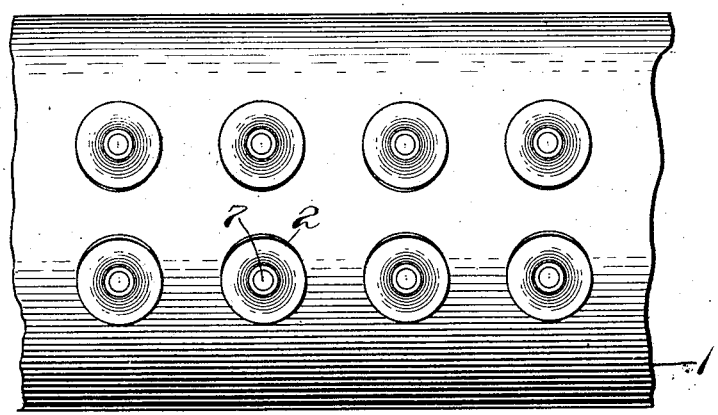
Figures 2, 4:
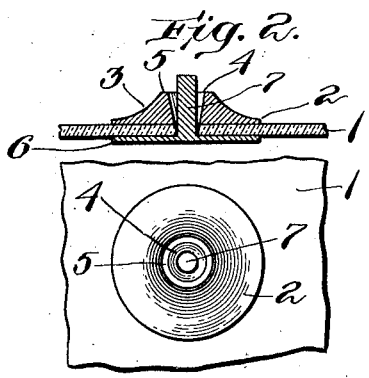
Figures 3, 5:
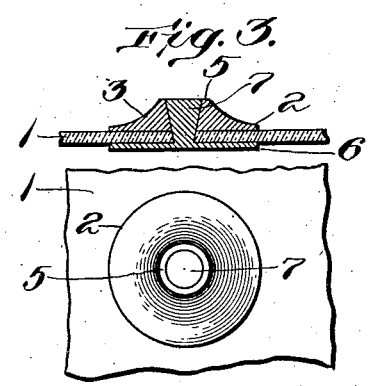
Figures 6, 7:
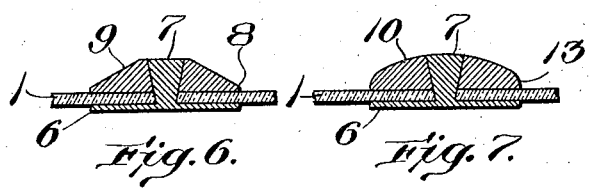

In the drawings, Figure 1 is a plan view of a portion of a protector-sleeve having rivets secured thereto in accordance with this invention. Fig. 2 is an enlarged sectional view of a single rivet and bur, showing the shank of the rivet passed through the sleeve and the bur before the rivet is headed down, illustrating one form of construction embodying the invention. Fig. 3 is a sectional view similar to Fig. 2 after the rivet has been headed down as in use. Fig. 4 is a plan of Fig. 2. Fig. 5 is a plan of Fig. 3. Fig. 6 is a sectional view showing a modified form of construction of the bur in which the outer side is a straight incline. Fig. 7 is a sectional view showing another modification in which the outer side of the bur is convex.

Referring now to the drawings, 1 represents the sleeve or cover, to which the rivets are attached.

In the form shown in Figs. 1 to 5, inclusive, the washer or bur 2 is shaped somewhat like the frustum of a cone, with concaved sides 3, forming a broad base and formed with a downwardly-tapering hole 4 through the center, the hole at the top being of nearly the same diameter as the top of the bur, so that the rim 5 of the bur around the top of the hole has a rather thin edge. The concaved form of the outer sides of the bur will maintain a thinner edge of the rim as it wears down than it would be if the sides were a straight incline. The rivet is formed with a flange 6, which bears against the inner face of the sleeve 1, and the shank 7 passes up through a hole in the sleeve and through the central hole of the bur, as shown in Fig. 2. The shank is then headed or riveted down, being made of such size in relation to the hole in the bur that when riveted down it will fill the hole, as shown in Fig. 3. Preferably the bur is made of hard steel and the rivet of soft or malleable metal. The bur thus protects the rivet, retarding the wear, and by reason of its sharp rim and tapering sides it will form a protuberance until very nearly worn down.

In the modification shown in Fig. 6 the bur 8 is formed with the outer sides 9 a straight incline instead of concave.

In the form shown in Fig. 7 the bur 9 is formed with the outer sides 10 convex.

The downwardly-tapering form of the hole and the corresponding form of the shank of the rivet when headed down prevent the bur from falling off until the bur is worn clear through.

What I claim is—

1. A tire-protector sleeve or the like provided with a plurality of outwardly-tapering frustum-shaped burs secured to the tread-face thereof, said burs each being formed with an outwardly-flaring central hole through the bur and having securing means consisting of a rivet having a flange on the inner end which bears against the inner face of the protector and a shank which passes outwardly through the sleeve and the hole in the bur, the shank of the rivet being headed down and spread after being passed through the bur so as to completely fill the flaring hole in the bur to the outer end thereof.

2. A tire-protector sleeve or the like provided with a plurality of outwardly-tapering frustum-shaped metallic burs secured to the tread-face thereof, said burs each being formed with an outwardly-flaring central hole through the bur and having securing means consisting of a rivet having a flange on the inner end which bears against the inner face of the protector and a shank which passes outwardly through the sleeve and the hole in the bur, the shank of the rivet being headed down and spread after being passed through the bur so as to completely fill the flaring hole in the bur to the outer end thereof, the rivets being formed of softer metal than the burs.

3. A tire-protector sleeve or the like provided with a plurality of outwardly-tapering frustum-shaped burs secured to the tread-face thereof, said burs each being formed with concaved outer sides and an outwardly-flaring central hole through the bur and having securing means consisting of a rivet having a flange on the inner end which bears against the inner face of the protector and a shank which passes outwardly through the sleeve and the hole in the bur, the shank of the rivet being headed down and spread after being passed through the bur so as to completely fill the flaring hole in the bur to the outer end thereof.

4. A tire-protector sleeve or the like composed of tough leather and provided with a plurality of outwardly-tapering frustum-shaped burs secured to the tread-face thereof, said burs each being formed with concave sides, an outwardly-flaring central hole through the burs, the diameter of the outer end of the hole being a little less than the diameter of the outer end of the bur so as to form a thin outer edge, and securing means for said bur consisting of a rivet having a flange on the inner end which bears against the inner face of the protector and a shank which passes outwardly through the sleeve and the hole in the bur and before being headed down extends beyond the end of the bur, the shank of the rivet being then headed down and spread after being passed through the bur so as to completely fill the flaring hole in the bur to the outer end thereof, said bur being made of steel and the rivet being composed of malleable metal.

In testimony whereof I have affixed my signature in presence of two witnesses.

HENRY P. PALIN

Witnesses:
  WILLIAM A. COPELAND,
  ROBERT WALLACE.